United States Patent

Wood

[11] 4,441,571
[45] Apr. 10, 1984

[54] FLUID BEARING

[76] Inventor: Kenneth G. Wood, 429 SW. 116th Pl., Seattle, Wash. 98146

[21] Appl. No.: 275,897

[22] Filed: Jun. 22, 1981

Related U.S. Application Data

[63] Continuation-in-part of Ser. No. 230,815, Feb. 2, 1981, abandoned.

[51] Int. Cl.³ ............................................. B60V 1/16
[52] U.S. Cl. .................................. 180/128; 180/124; 180/125
[58] Field of Search ..................... 180/125, 116–130; 114/67 A; 104/23 FS; 239/265.19; 254/93 HP; 428/65

[56] References Cited

U.S. PATENT DOCUMENTS

| 3,161,247 | 12/1964 | Mackie | 180/124 |
|---|---|---|---|
| 3,243,004 | 3/1966 | Mackie | 180/124 |
| 3,245,487 | 4/1966 | Mackie | 180/124 |
| 3,251,432 | 5/1966 | Fischer et al. | 180/124 |
| 3,253,667 | 3/1966 | Mackie | 180/124 |
| 3,260,322 | 7/1966 | Mackie | 180/124 |
| 3,313,367 | 4/1967 | Swedburg | 180/124 X |
| 3,321,038 | 5/1967 | Mackie et al. | 180/124 |
| 3,513,934 | 5/1970 | Crowley | 180/124 |
| 3,513,936 | 5/1970 | Crowley et al. | 180/124 |
| 3,618,694 | 11/1971 | Crowley | 180/124 |
| 3,647,018 | 3/1972 | Croix-Marie et al. | 180/124 |
| 3,835,952 | 9/1974 | Croix-Marie et al. | 104/23 FS |
| 4,313,513 | 2/1982 | Terry | 180/124 |

FOREIGN PATENT DOCUMENTS

| 1261696 | 2/1968 | Fed. Rep. of Germany | 254/93 HP |
|---|---|---|---|
| 2337090 | 2/1974 | Fed. Rep. of Germany | 254/93 HP |
| 2027655 | 2/1980 | United Kingdom | 180/127 |
| 502601 | 4/1976 | U.S.S.R. | 254/93 HP |

Primary Examiner—Joseph F. Peters, Jr.
Assistant Examiner—Mitchell J. Hill

[57] ABSTRACT

A fluid bearing with a multicomponent membrane which is inflated to form a torus defining a plenum chamber. The preferred three layer membrane has a fluid impermeable inner layer, a middle layer of a dimensionally stable fabric, and an abrasion resistant outer layer. The layers may be replaced independently. A number of different mechanisms for attaching the layers to the load-carrying member of the bearing are shown, and different membranes having different lift heights may be used with a single load-carrying member. In one embodiment one of a series of interchangeable metal rings of different diameters used with the middle layer of the membrane may be selected to control the lift height. The bearing also includes a replaceable orifice plate which controls the rate of flow into the plenum chamber and into and out of the torus membrane. A valve operates during the usual gradual start up to block flow of fluid to the plenum until the pressure in the torus membrane is one or two p.s.i. above atmospheric.

27 Claims, 8 Drawing Figures

FLUID BEARING

This application is a continuation-in-part of U.S. patent application Ser. No. 230,815, filed Feb. 2, 1981, now abandoned.

This invention relates to the art of load bearing devices and more specifically to a device which incorporates the lifting principles of a fluid under pressure to lift and to facilitate transporting a load.

The basic principles of fluid film bearings are well known. Fluid film bearings have a rigid load carrying plate to the bottom of which a flexible, inflatable membrane is attached. When the membrane is inflated with fluid (which may be either liquid or gaseous), it expands to take on a toroidal shape. The bottom of the membrane contacts the underlying floor thereby forming a plenum chamber between the radially inner surface of the toroidal membrane, the floor or other support surface on which the bearing is resting, and the load bearing plate. Fluid under pressure fills the plenum, and the toroidal membrane serves to capture this fluid within the plenum. As more fluid is added to the plenum, the pressure within it rises and the bearing is lifted. Fluid then escapes from the plenum between the bottom of the toroidal membrane and the floor or other support surface in a uniform thin film.

The fluid in the plenum chamber lifts the bearing up from the support surface and causes the bearing and its load to float upon the thin film of escaping fluid. There is no mechanical contact between the fluid bearing and the support surface, and therefore friction is virtually eliminated. Further, the bearing has no ground reference direction and may be rotated or moved in any direction with almost no restriction. With proper design and flow rates, a condition of equilibrium is achieved in which the pressure within the plenum chamber is substantially constant and the bearing is lifted so that there is no contact between the toroidal membrane and the support surface.

Two general types of fluid bearings incorporating the above fluid lift principles are known. In one type, pressurized fluid such as air is introduced into a toroidal membrane fixed to the underside of a bearing plate. The toroidal membrane is formed of a flexible material, and there is at least one orifice opening into the plenum chamber enclosed by the membrane which allows the air to flow in series through the toroidal membrane and into the central plenum chamber.

This series flow-through design dictates a limited flow rate for the working fluid escaping from the plenum because the orifice(s) in the toroidal membrane communicating between the interior of the toroidal membrane and the central plenum are fixed in size. If the fluid flow rate is increased beyond the design maximum in an attempt to carry a heavier load or to cross a coarse or uneven surface, the toroidal membrane may rupture. Fluid bearings of this type are illustrated in U.S. Pat. Nos. 3,313,367 and 3,161,247.

In a second design the fluid bearing inflates and floats by what may be termed split-flow velocity impact. In this type of device, a fluid stream is directed against the wall of a toroidal membrane which includes fluid passages into the interior of the toroidal membrane causing the inflation thereof. Excess fluid introduced into the system "spills" into a plenum chamber defined by the inflated membrane. With this design, alignment of the orifices on the flexible, bellow-formed torus structure is critical to proper inflation and lift. Further with this design, the torus may be stubbed on a raised object on the support surface thereby bearing turned under causing fluid to be dumped from the plenum as well as possible physical damage by tearing. Oscillation or flapping may occur during inflation of this type of air bearing when air in the plenum acts against a toroidal membrane which is not fully inflated. Fluid bearings of this type are described in U.S. Pat. Nos. 3,513,934; 3,513,936; and 3,618,694.

A problem inherent in both of the above types of fluid bearings is that the flexible toroidal membrane is a composite structure of fabrics and elastomers where layer(s) of fabric are impregnated with the elastomers by, e.g., vulcanization. This material is suitable only for gaseous fluid operations since liquid fluids cause wicking and consequent deterioration of the bonding of the elastomers to the fabric. In many prior art fluid bearings the membrane has been made of a preformed flexible material which will not collapse uniformly or lie flat when inactive. This can lead to a distortion set to the flexible membrane which will not provide a reliable seal thereafter.

Further, the composite fabric/elastomeric material selected to form the toroidal membrane must meet several different design criteria. First it must be flexible so that it can collapse when deflated. It must be impermeable to the fluid used so that the membrane may be inflated. The toroidal membrane must also be dimensionally stable so that it will not stretch out of shape when under pressure. Finally, for a long service life the toroidal membrane must be resistant to abrasion. The use of a single composite material to meet all these design goals has placed limits on the performance achievable. Commercially available composites force a compromise between flexibility and wear resistance. Additionally, vulcanized composite material does not lend itself to easy repair, and in particular, it is nearly impossible to repair a torn seam of such material.

SUMMARY OF THE INVENTION

The present invention provides a fluid bearing for supporting a load on a support surface which has a multicomponent membrane. The use of a multi-component membrane avoids the compromises necessitated by a single membrane performing many functions. The present invention also provides for initiation of inflation of the membrane to a predetermined pressure prior to pressurization of the central plenum chamber which is created thereby. These features avoid problems associated with prior devices such as noninflation due to lack of proper orientation and flapping discussed above. Because the toroidal membrane is in parallel with the plenum, a wider range of operating conditions may be handled by a single bearing than was possible in prior devices.

In accordance with the present invention, a fluid bearing for supporting a load on a support surface comprises a load receiving member having a first surface for receiving a load thereon and a second surface having a diaphram member or membrane attached thereto. The membrane is inflatable to form a wall extending between the load receiving member and the underlying support surface. A plenum chamber is enclosed by the membrane, the load bearing member and the support surface. A suitable source supplies fluid under pressure to the membrane and plenum chamber.

The membrane is preferably shaped to form a toroid when inflated, but the present invention is not limited to a toroidal membrane since other shapes could also be used. The membrane is formed of three layers, an inner membrane, a middle membrane and an outer membrane. The inner membrane is formed of a resiliently expansible, fluid impermeable material. The middle membrane is located between the inner and outer membranes and comprises a flexible, substantially dimensionally stable fabric which limits the expansion of the inner membrane when inflated. The outer membrane is formed of a flexible stretchable material which is abrasion resistant. In one preferred embodiment the extent of lift of the load receiving member above the supporting surface can be selected by replacing a ring which controls the geometry of the middle membrane with a ring of a different diameter.

The flow of fluid into and out of the toroidal cushion is controlled by an orifice the size of which is selected to tune the toroidal cushion so that it acts as a resonator chamber. The toroidal chamber then acts to dampen pressure oscillations between the toroidal chamber and the plenum.

Fluid flow from the pressure source into the plenum chamber is controlled by a valve which remains closed to block fluid flow to the plenum chamber until the pressure within the interior of the toroidal membrane exceeds a predetermined minimum. The pressure relief valve operates to assure that the toroidal membrane is at least partially pressurized before the plenum is filled with fluid under pressure and that the pressure in the membrane remains slightly above the pressure in the plenum during operation. In practice the valve maintains the pressure in the membrane one or two p.s.i. greater than the pressure in the plenum.

In steady state operation, once the membrane is inflated, there is no further fluid flow into the torus and all the fluid flows into the plenum to escape beneath the torus. The flow rate of fluid into the plenum is controlled by a replaceable orifice plate. If the fluid bearing is disturbed from steady state operation, fluid may again flow into or out of the toroidal membrane. This flow rate is controlled by another replaceable orifice plate. The two orifice plates may be changed independently in order to tune the fluid bearing for different loads, different fluids or different support surfaces. The operating fluid may be either gaseous or liquid. The different orifice plates may have holes of different sizes and/or different numbers of holes to accommodate the different loads and/or operating fluids.

BRIEF DESCRIPTION OF THE DRAWINGS

These and other advantages and features of the present invention will become apparent upon consideration of this specification and the accompanying drawings forming a part thereof and in which.

DETAILED DESCRIPTION OF PREFERRED EMBODIMENT

Figure 1:
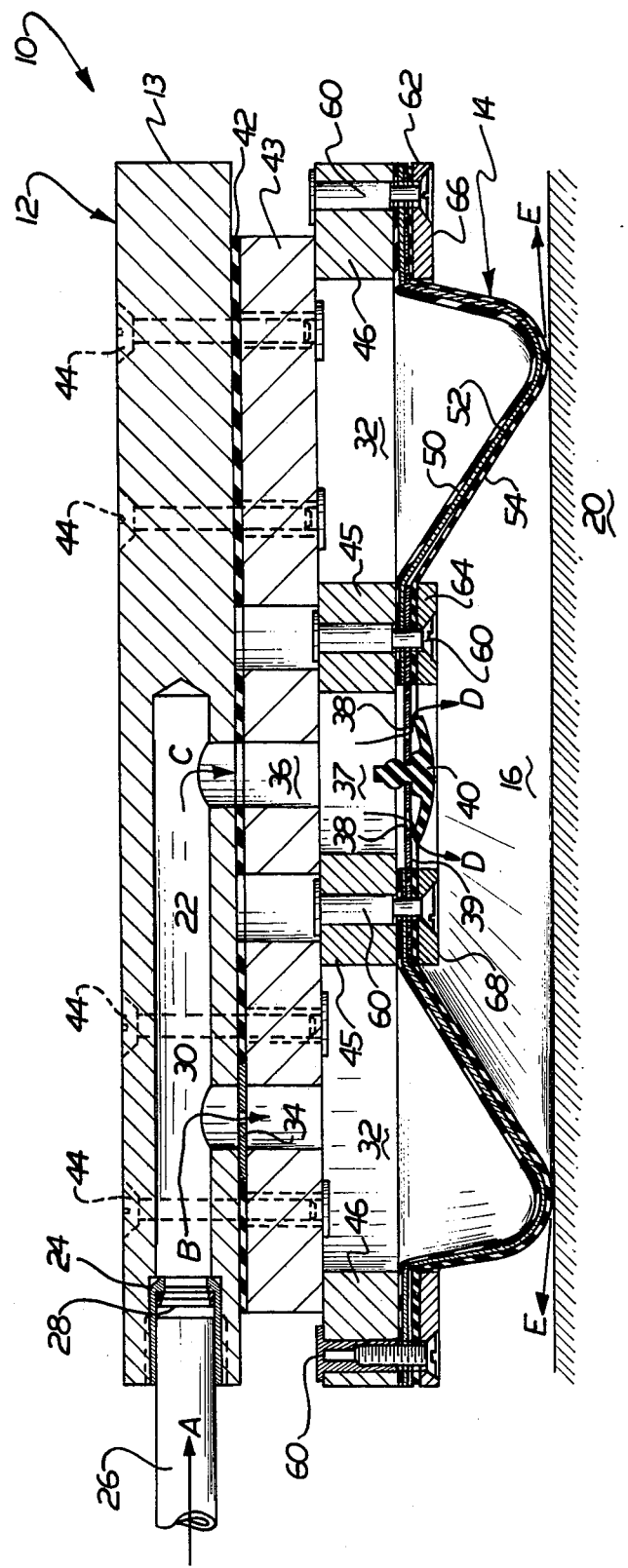
FIG. 1 is a side elevational view, in section, of a fluid bearing made in accordance with the invention.

Referring to the drawings, which are for the purposes of illustrating preferred embodiments of the invention only, and not for the purpose of limiting same, FIG. 1 shows a fluid bearing 10 in an inflated, operational mode. The bearing 10 generally comprises a top load receiving plate assembly 12 and an inflated toroidal membrane 14 connected thereto and enclosing a pressurized plenum 16. In an operating condition, the bearing 10 is "floating" above a floor or other underlying support surface 20 on a uniform thin film of air escaping from the plenum 16 between the bottom of the membrane 14 and the support surface 20 as shown by the arrows E. It should be noted that the following description and claims refer to the bearing 10 as carrying or supporting a load on a "floor" or other "underlying" support surface. This is by way of example only not by way of limitation since the bearing 10 may be used in other orientations.

Figure 5:
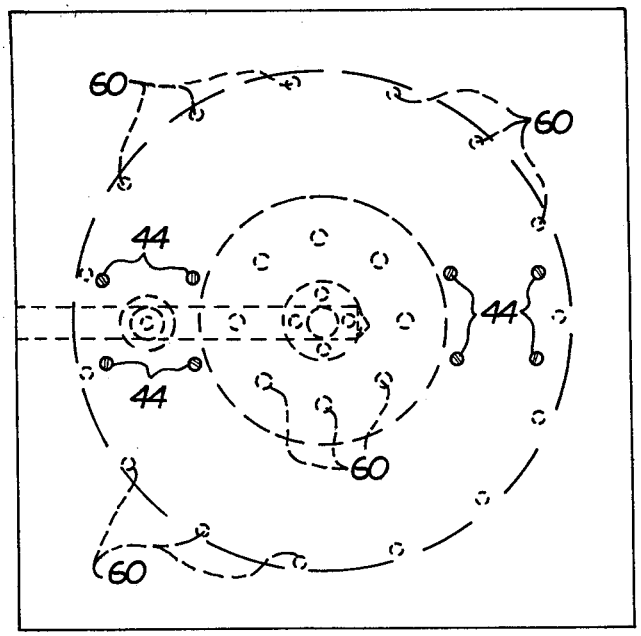
FIG. 5 is a top fragmentary plan view of the fluid bearing illustrated in FIG. 1.

The load receiving assembly 12 has a first surface for receiving a load thereon preferably comprising a flat square plate 13 (FIGS. 1 and 5). The plate 13 is formed of a strong light weight metal such as aluminum although other materials could be used. The plate 13 may also be provided with special fittings or threaded holes to accommodate different types of loads. Generally, the fluid bearing 10 will be used together with other similar bearings under a pallet or other structure which in turn supports the object to be moved. The top plate 13 has an internal passage 22 with a connector 24 located at the outward end thereof for receiving a flexible pressurized fluid conduit 26 having an appropriate connector end portion 28 associated therewith. Connectors 24 and 28 comprise the socket and plug members of a quick-connective coupling, although other means of connection may be provided.

To operate the bearing 10, pressurized fluid is admitted to the internal passage 22 through the flexible conduit 26 in the direction of arrow A. Initially, fluid flows as indicated by arrow B from the internal passage 22 through an outlet passage 30 to a torus chamber 32. An interchangeable metal orifice plate 34 is positioned in the outlet passage 30 for restricting the fluid flow through the outlet passage 30. When the torus chamber 32 is fully inflated and a steady state is reached, no fluid flows through passage 30. If the steady state is disturbed, fluid may flow through the orifice in orifice plate 34 between the torus chamber 32 and the plenum 16. The size of the orifice in orifice plate 34 is selected so that the torus chamber 32 acts as a resonator and dampens pressure oscillations between the torus chamber 32 and the plenum 16.

A second fluid outlet passage 36 conducts fluid in the direction of arrow C from internal passage 22 to the plenum 16 through valve chamber 37. An interchangeable metal orifice plate 39 is positioned at the downstream end of the valve chamber 37. A plurality of orifices 38 located in the orifice plate 39 communicate with the plenum 16. A valve 40 is located in orifice plate 39 and acts to block the passage of fluid in the direction of arrows D through the orifices 38 until sufficient pressure is built up within the passage 22 during operation of the air bearing 10. The valve 40 is preferably formed of a resilient elastomeric material, but other types of relief valves could be used.

In order for sufficient pressure to build up within the passage to release fluid through valve 40, the membrane 14 which forms a flexible wall of the torus chamber 10 must first be at least partially inflated by fluid under pressure. In the usual start up procedure a valve controlling the flow through conduit 26 is gradually opened. Fluid flows into passage 22, through the orifice in plate 34 into the torus chamber 32. When inflated, the membrane 14 forms a toroidal wall extending between the load receiving member 12 and the support surface 20 and encloses the plenum chamber 16 therebetween.

In the usual gradual start up the valve 40 does not open until after the toroidal membrane 14 is at least partially inflated. The extent of inflation of the membrane 14 prior to opening of the valve 40 depends on several factors. For example, if the bearing 10 is designed for a low operating pressure, i.e., 2 to 10 p.s.i., and the pressure is increased gradually up to the operating pressure, a good seal between the membrane and the floor 20 may occur before the valve 40 opens. On the other hand, if the supply of fluid is turned on abruptly, or the bearing 10 is designed for a relatively high working pressure, e.g., 50 p.s.i., then the valve 40 may open before the membrane 14 has more than bulged slightly.

The relief valve 40 and the orifices 38 cooperate to maintain the pressure in the torus chamber 32 slightly above the pressure in the plenum chamber 16. When the flow rate of fluid through conduit 26 into the plenum chamber 16 is low, as during normal start up, the relief valve 40 maintains the pressure in the torus chamber 32 one or two p.s.i. above that in the plenum. When the flow rate increases to the point that dynamic properties of the fluid are dominant, the orifices 38 establish a pressure drop of one or two p.s.i. In the event that a large volume of high pressure fluid is abruptly admitted through conduit 26 into passage 22, e.g., by suddenly opening a supply valve, the pressure drop across the orifice in plate 34 will cause the valve 40 to open almost instantly. But the pressure drop across the orifice 38 will cause the pressure in the torus chamber 32 to be at least slightly above that in the plenum 16. It is also possible to operate the fluid bearing 10 without the valve 40 when the orifice in plate 34 and the orifices 38 have been properly selected for the operating conditions to be encountered, i.e., load, fluid flow rate, lift height, floor smoothness, etc.

The fluid bearing 10 may be used with either gaseous or liquid operating fluids. The bearing 10 is designed to easily accommodate changes in operating fluid, as well as changes in loads, support surface roughness, or required lift height. Located below the plate 13 and separated from it by a gasket 42 is an interplate 43 which is also formed of a strong light weight material. The load bearing plate 13 and the interplate 43 are held in sealing engagement with each other by a plurality of threaded fasteners 44. Metal orifice plate 34 is clamped between interplate 43 and load bearing plate 13. The orifice plate 34 may readily be exchanged for a plate having a different sized orifice when necessary, as when a different fluid is being used or when different loads are carried or different support surfaces 20 are encountered. As will become clear from the discussion below, the orifice plate 39 is also readily exchangeable for an orifice plate having a different size or number of orifices or having a valve which opens at a different pressure.

The load receiving assembly 12 also has a second surface for attaching the membrane 14 thereto which comprises a pair of spacer plates 45 and 46 connected with the lower surface of the interplate 43. The spacer plates 45 and 46 are both annular rings, and they are mounted concentric with each other. The spacer rings 45 and 46 are made of a suitable strong and light weight material and are connected to the interplate 43. It is contemplated that the interplate 43 and space rings 45 and 46 could be integrally formed from a single piece of material, either by machining or by casting in a suitable mold.

The cylindrical volume defined by the inside of the spacer ring 45 forms the relief valve chamber 37, and it communicates with the internal passage 22 through passage 36 in the load bearing plate 13 and the interplate 43. The volume between the outside of spacer ring 45 and the inside of spacer ring 46 forms the torus chamber 32. Passage 30 through the interplate 43 and load bearing plate 13 connects the torus chamber 32 with the internal passage 22. As is discussed more fully below, the membrane 14 is removably connected to the lowermost surfaces of the spacer rings 45 and 46. The lowermost surface of the spacer ring 45, e.g., forms a radially inner annular surface, while the lowermost surface of the spacer ring 46, e.g., forms a radially outer annular surface.

The membrane 14 is a composite, three layer structure. An elastic, fluid-impermeable, flexible material forms an inner membrane 50 which stretches under the pressure of the fluid admitted to torus chamber 32. A middle membrane 52 comprises a flexible, dimensionally stable fabric which limits the expansion of the inner membrane 50 as it is inflated. An outer membrane 54 is made of a flexible elastic material which is scuff resistant and stretchable. The outer membrane protects the middle and inner membranes 52, 50 from abrasion and wear encountered in use of the bearing 10. Each of the three layers may be selected for individual properties. There is no need to make them bindable to each other or to settle for a single composite layer.

As stated previously, one of the major drawbacks of prior fluid bearings was the repair and/or replacement of the toroidal membrane. An advantage to the design of the bearing 10 is the easy replacement of the toroidal membrane 14. The preferred three layer toroidal membrane 14 generally requires the replacement of only the outer membrane 54 since this is the membrane component exposed to wear. Generally, the inner and middle membranes will require replacement only at great intervals relative to the replacement interval for the outer membrane 54.

The middle membrane 52 may also be changed to provide a different lift height for the bearing 10. Because of this, a user may purchase a bearing with a lift height suited to his application, and if he requires several different lift heights, he may purchase several different middle membranes and use them according to his needs. Moreover, because the inner, middle and outer membranes 50, 52 and 54 are separate, the material for each may be selected for the function it is to perform, without regard to whether it can be vulcanized to bond with adjacent layers. This means that the membrane 14 can provide greater lift heights than previously possible, thus widening the applications in which the air bearing 10 may be used.

Further, because the layers 50, 52 and 54 are separate, the material for each layer may be purchased independently, and this means that there are a larger number of commercial sources from which to obtain the materials. For this reason users should experience fewer parts-availability problems. The fact that the three layers 50, 52 and 54 are not vulcanized means that the toroidal membrane 14 is substantially more economical to manufacture, maintain, and repair than air bearings with vulcanized membranes.

Figure 2:
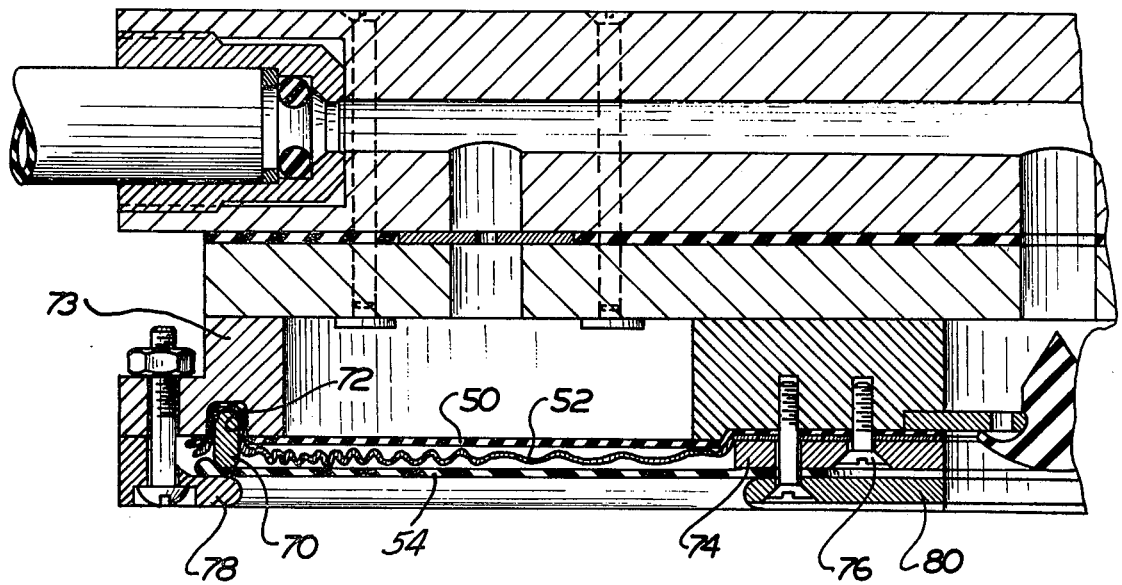
FIGS. 2 and 3 illustrate alternative means for securing a toroidal membrane to the fluid bearing structure of FIG. 1.
Figure 3:
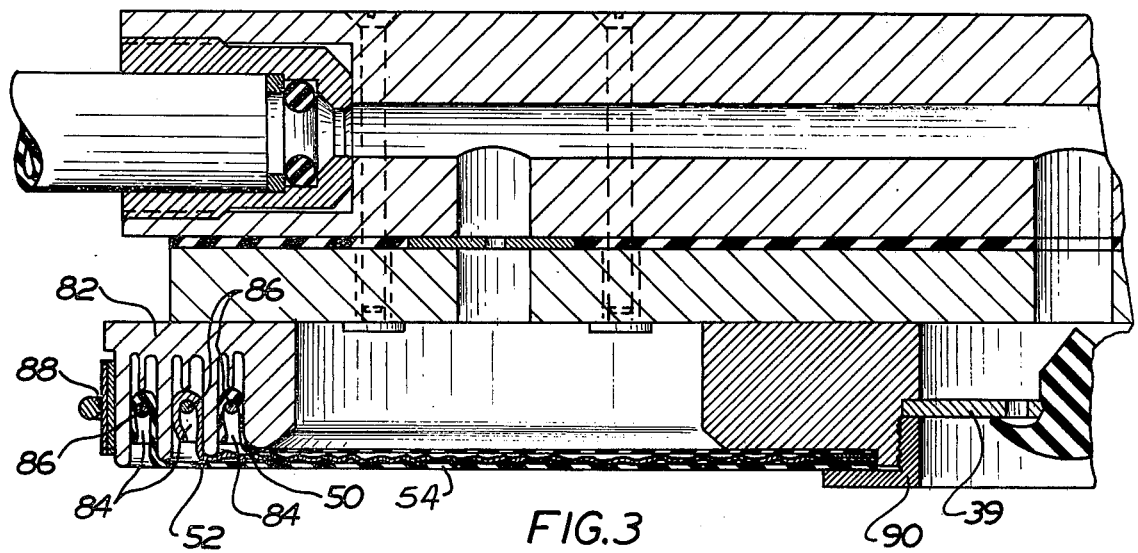

FIGS. 1, 2 and 3 illustrate three different preferred means for mounting the inner, middle and outer membranes 50, 52 and 54 to the fluid bearing 10. In FIG. 1, inner, middle and outer membranes 50, 52 and 54 are clamped by means of screw and nut assemblies 60 passing through the radially inner and radially outer perimeter portions of the annular membrane components. An outer retainer ring 62 is clamped to the lower portion of outer membrane 52 by the screw and nut assemblies 60 to the outer spacer ring 46. In a similar manner, a ring shaped retaining ring 64 is provided for clampingly securing the membranes 50, 52 and 54 around their inward edges to the inner spacer ring 45. Because the retaining rings 62 and 64 are secured by simple threaded fasteners, they may be easily removed to replace or repair any component of the membrane 14. The annular rings 62 and 64 may also be used as landing pads to support the fluid bearing 10 (and the load on it) in the absence of fluid under pressure.

In some prior art devices the membrane is doughnut shaped and attached along a single circle at the highest point of the membrane. See U.S. Pat. No. 3,618,694. This permitted the membrane to snag on surface irregularities. Membrane 14 of the present invention does not overhang or extend radially beyond either of the retaining rings 62 and 64. The membrane 14 is secured to the load receiving member 12 along the radially inner and radially outer perimeters of the membrane, and therefore less snagging of the membrane on surface irregularities is encountered.

FIG. 2 illustrates a variation on the mounting assembly for the membrane 14 as shown in FIG. 1 with the air bearing deflated. In the embodiment illustrated by FIG. 2, the second surface of the load-receiving assembly has a radially outer position comprising an outer spacer ring 73. The inner and middle membranes 50, 52 are held securely in place by an outer pressure or retaining ring 70 which compresses and holds the outer edges of the inner and middle membranes 50, 52 within a circumferential groove or slot 72 formed in the outer spacer ring 73. The inward edges of the inner and middle membranes 50 and 52 are clamped by a ring plate 74 against a radially inner annular surface of the load-receiving assembly, such as by employing bolts 76 instead of the screw and nut assembly 60 shown in FIG. 1. The outward edges of the outer membrane 54 are clamped against the ring 70 by ring shaped clamp plate 78 while the inward edges are secured by a landing ring 80 which is similar to the landing ring 64 of FIG. 1. With this arrangement, it not necessary to disturb the inner and middle membranes 50, 52 in order to replace the outer membrane 54 when it becomes worn through abrasion in service.

The mounting system shown in FIG. 3 utilizes a radially outer portion of the second surface of the load-receiving assembly comprising spacer ring 82. Ring 82 has a plurality of circumferential grooves or slots 84 formed therein. A metal wire retaining ring 86 is inserted in each of the slots 84 with one of the inner, middle or outer membranes 50, 52, 54 draped thereover so that each fits snuggly within a slot 84. A ring clamp 88 is then drawn tightly about the circumferential exterior of the plate 82 to compress the membranes 50, 52, 54 and wire rings 86 within the slots 84 to lock the parts into engagement. The radially inner eges of the membranes 50, 52 and 54 are then secured by a threaded flanged nut 90 which clamps the inner edges of the membrane to the inner space ring and also holds the orifice plate 39 in place.

As can be seen from FIGS. 2 and 3, which illustrate the fluid bearing 10 in a deflated condition, the membrane 14 lies flat when not fully inflated. The middle fabric membrane 52 is bunched between the resilient inner and outer membranes 50, 54. The membrane 14 is connected with bearing 10 by radially spaced retainer rings 62 and 64 (FIG. 1), and as a result, the membrane inflated is not prone to snagging or catching on objects on the floor 20 because of its firm mounting and the smoothly curving surface it presents to the floor.

Figure 4:
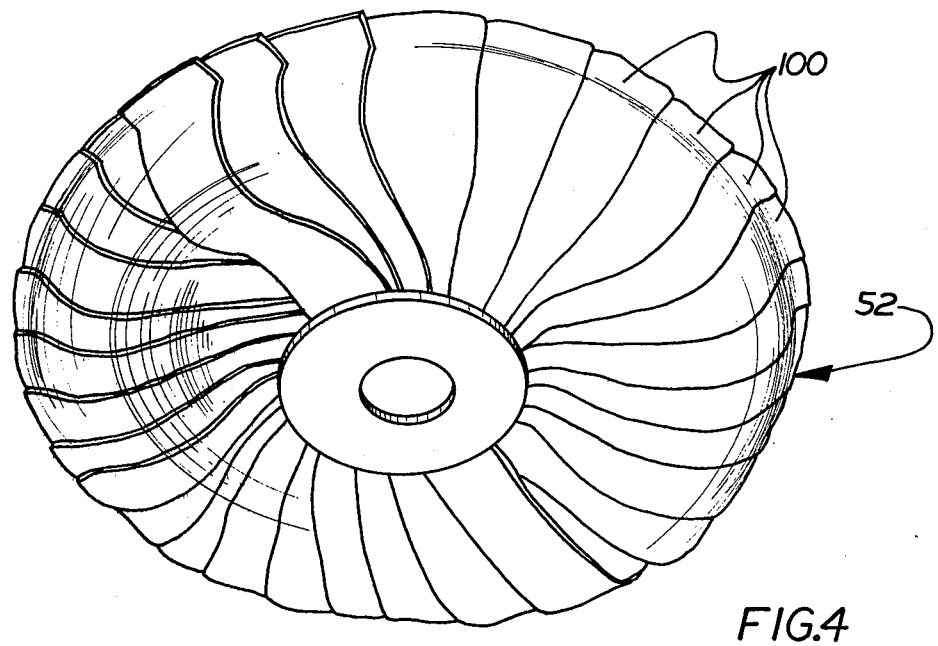
FIG. 4 illustrates one form of a middle membrane structure which may be utilized in accordance with any of the embodiments of FIGS. 1-3.

In order to retain dimensional stability of the fabric middle membrane 52, it is desirable to form the membrane so that it has radial symmetry. Although a one-piece fabric woven with a standard rectilinear pattern of woven fibers can be used as the middle membrane 52, such is not preferred because, under pressure, such a fabric stretches differently in different directions. Accordingly, in one preferred embodiment a membrane 52 illustrated in FIG. 4 is used. The membrane 52 is formed by a plurality of overlaid radially disposed fabric ribbons 100. This arrangement approximates the desired radial symmetry, and thus the membrane 14 stretches evenly in all directions. As an alternative, a plurality of woven fabric panels of trapezoidal form may be joined together in order to reduce radial distortion.

Figure 6:
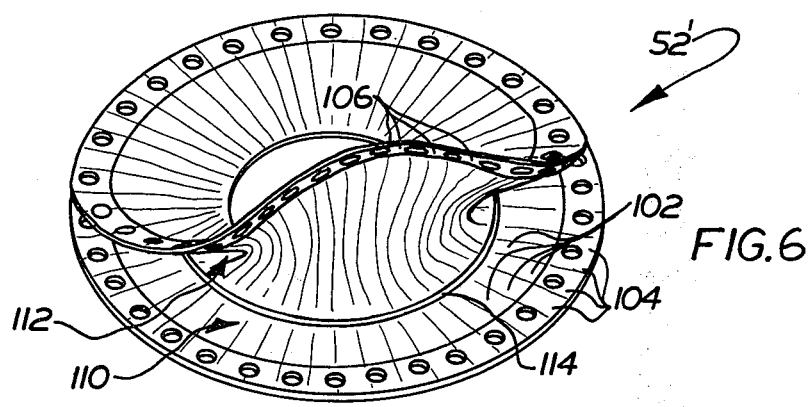
FIG. 6 is a perspective illustration of a midmembrane suitable for use in any of the embodiments illustrated in FIGS. 1-3 and which provides for an adjustable lift by utilizing different stroke-limiting rings.
Figure 8:
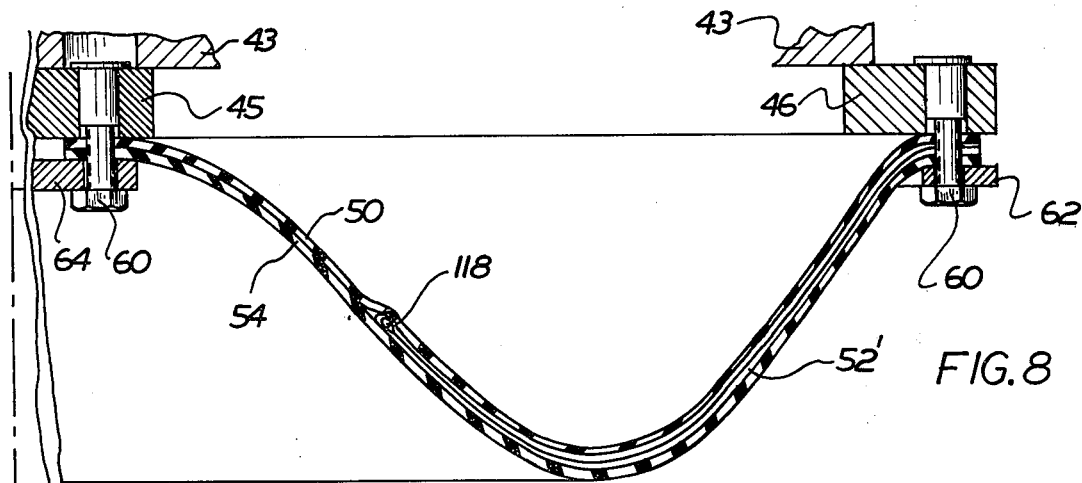
FIG. 8 is a cross sectional illustration of the midmembrane illustrated in FIG. 6 using a stroke-limiting ring which provides a relatively large stroke.
Figure 7:
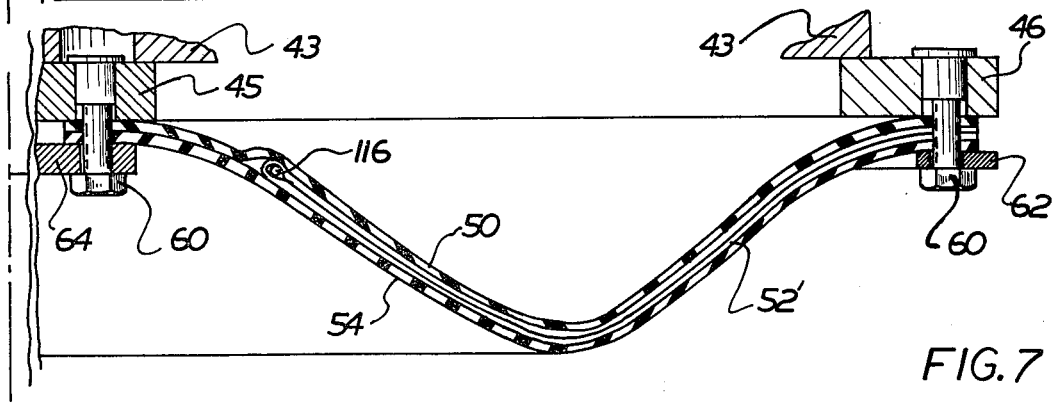
FIG. 7 is a cross sectional view of the midmembrane illustrated in FIG. 6 utilizing a stroke-limiting ring to provide a relatively small stroke.

FIGS. 6–8 illustrate a second preferred embodiment of the midmembrane 52'. In the midmembrane 52' the selection of the size of a metal retaining ring 114 (FIG. 6) controls the geometry of the midmembrane and thus the lift height of the fluid bearing. Therefore, the midmembrane 52' together with a number of retaining rings 114, 116 and 118 of different diameters is an alternative to a fluid bearing in which lift height is controlled by replacing the entire membrane.

The midmembrane 52' is composed of an array of radially disposed bands 102 of a dimensionally stable fabric such as nylon. Each band 102 is folded in half and positioned so that its lateral edges overlap the edges of the adjacent bands, and the bands 102 are folded so that the end portions 104 and 106 of the bands 102 are superimposed upon each other at the radially outer perimeter portion of the midmembrane 52'. The end portions 104 are bonded to each other and the end portions 106 are bonded to each other.

The result is a midmembrane 52' that is composed of two layers 110 and 112 that have a fixed outside diameter. However, the inner diameter can vary because the bands 102 overlap but are not fixed to each other. A retaining ring 114 is used to control the inside diameter of the midmembrane and thus its geometry in a manner discussed below.

When using the midmembrane 52' in one of the fluid bearings illustrated in FIGS. 1–3 the midmembrane 52' is secured around its outer perimeter in the manner illustrated in FIG. 1, 2 or 3 and described in conjunction therewith. However, the inner perimeter of the midmembrane 52' is not secured to the inner spacer ring 45. Instead, the retaining ring 114 is placed between the upper and lower layers 110 and 112 of the midmembrane 52'.

The ring 114 limits the extent of movement by the midmembrane 52'. If the inner ring 114 is as small in diameter as the bands 102 will permit, the midmembane 52' will be a nearly flat annular disc even when installed between two other membranes on a fluid bearing and under pressure. However, by using larger and larger inner rings such as the inner rings 116 and 118 illustrated in FIGS. 7 and 8, the midmembrane bows under pressure with the larger ring 118 producing a more curved membrane with a taller profile. Because the midmembrane 52' controls the extent of stretching of the inner membrane 50, the selection of a ring 114, 116, and 118 of the desired diameter is effective to control the lift stroke height of the air bearing 10. A user may select the stroke height required or best suited to his application and alter the stroke height by merely selecting the appropriate diameter for a retaining ring. Moreover, better performance is achieved because the ring 114, 116 or 118 floats freely to establish uniform radial tension within the bands 102 forming the midmembrane 52'.

Thus, it is clear that the present invention provides a fluid bearing 10 (FIG. 1) for supporting a load on a support surface 20 which has a multicomponent membrane 14. The use of a multi-component membrane 14 avoids the compromises necessitated by a single membrane performing many functions. The present invention also assures that during normal gradual start up the membrane 14 is inflated prior to pressurization of the central plenum chamber 16 which is created thereby, and during operation the pressure within the membrane is maintained slightly above the pressure in the plenum. These features avoid problems associated with prior devices such as noninflation due to lack of proper orientation and flapping. Because the toroidal membrane is in parallel with the plenum, a wider range of operating conditions may be handled by a single bearing than was possible in prior devices.

In operation the membranes 50 and 54 are initially flat as shown in FIGS. 2 and 3, and the load resting on the load receiving member 13 is supported by landing pads, such as rings 62 and 64, or other landing pad structures outside the bearing (not shown).

In order to activate the bearing, hose 26 is connected to a source of pressurized fluid such as air, which enters the passage 22 and outlet passages 30 and 36. During normal start up the air pressure in the hose 26 is gradually increased and the air enters the torus chamber 32 via the orifice in plate 34 which limits the rate of air flow into the toroidal chamber. The pressure inside the membranes 50, 52, 54 increases, but at a limited speed determined by the throttling effect of the orifice in plate 34, so that the membranes stretch in an orderly fashion and eventually reach the surface of the floor 20.

Air simultaneously fills the valve chamber 37, and opens the valve 40 when the pressure in chamber 37 reaches one or two p.s.i. above atmospheric. As discussed above, the membranes 50, 52, and 54 may fully inflate and seal against the floor 20 when the valve 40 opens, or the membranes may be only partially inflated, depending on design and start up characteristics. Once the valve 40 is open, air flows into the plenum 16 via orifices 38. The air escapes from the plenum 16, but the throttling effect of orifices 38 and valve 40 limits the flow of air so pressure is maintained in passage 22 while membranes 50, 52, 54 are inflated.

Very soon the outer membrane 54 reaches the surface of the floor 20 if it has not already done so and forms an air seal, and pressure starts building up inside the plenum 16. The pressure inside the plenum 16 quickly becomes sufficient to lift the load receiving member 13 with the load resting on it, but at the same time the membranes 50, 52, 54 continue to expand, thereby maintaining the seal around the plenum. During this interval the bearing lifts the load with little air escaping from the plenum.

Eventually membranes 50, 52, 54 will be stretched as far as the dimensionally stable middle membrane 52 will allow, and further lifting of the load receiving member 13 results in an air gap forming between the lower edge formed by the outer membrane 54 and the surface of the floor 22. At this point there will be no further net flow of air into the torus chamber 32, and no more net buildup of air volume in the plenum 16.

The air escaping between the floor and the lower edge of the inflated membrane 14 forms a thin air film on which the bearing will "float" virtually friction free if the floor surface is smooth and the lower lip of the membrane is smooth and ripple free. Rough surfaces can still form a continuous air film if the air flow is large, but the maximum air flow is limited by the orifices 38 and valve 40, as well as by the capacity of the source of pressurized air.

During steady state operation of the bearing 10, the pressure in the plenum 16 is only slightly lower than the pressure inside the torus chamber 32. The membrane 14 will thus have little tendency to curve towards the plenum 16, and forms a substantially straight conical surface from ring 45 outward to the seal area. The pressure in the toroidal chamber 32 is, however, much tighter than the atmospheric pressure, so the membrane 14 forms a sharply curved surface between the ring 45 and the seal area of the bearing, as indicated in FIG. 1. Because the pressure differential across the inner part of membrane 14 is so small, no fabric reinforcement is required in this part of the membrane, which explains why a middle membrane structure as shown in FIGS. 6, 7 and 8 can be used.

When the air supply to the hose 26 (FIG. 1) is shut off, air escapes from the plenum 16 mainly along the lip of membrane 14. The load and the load receiving member 13 accordingly sinks as fast as air escapes from the torus chamber 32 via the orifice in plate 34 and valve 40, until the landing pads support the load. The membranes continue to contract until the stretchable membranes 50 and 54 are flat with the fabric layer 52 bunched between them. The outer membrane 54 is punctured at suitable points away from the seal area to allow air trapped between membranes 50 and 54 to escape. If the air supply to hose 26 was interrupted by venting it to atmosphere, then the valve 40 closes and the bearing 12 settles as air escapes through the orifice in plate 34.

The description above has assumed steady-state, stable operation. In actual use, there will be rocking of the load and bumps which tend to upset the equilibrium in the air bearing. In order to avoid instability and flapping of the air bearing, it is sufficient to tune the orifices 34, 38 and valve 40 together with the air volumes in the chambers 32, 16 and 22 and 37. The best values vary with the bearing size, load capacities etc., and are usually determined by testing, but they can also be determined by computer simulation or calculations. The parallel air flow system used provides for more tuneable variables and easier tuning than older air bearing designs, and enable bearings of this construction to work in a much wider load range than previously known air bearings.

While the invention has been described in the more limited aspect of preferred embodiments thereof, other embodiments have been suggested and still others will occur to those upon a reading and understanding of the foregoing specification. It is intended that all such embodiments be included within the scope of the invention as limited only by the appended claims.

What is claimed is:

1. A fluid bearing for supporting a load cell on a support surface, said bearing comprising a member having a first surface for receiving a load thereon and a second surface, a generally annular flexible membrane, connecting means for sealingly connecting said annular membrane with the second surface of said load receiving member along radially inner and radially outer perimeter portions of said membrane, fluid inlet means for connecting said fluid bearing with a supply of operating fluid under pressure, first fluid outlet means disposed in said second surface of said load receiving member between said perimeter portions of said membrane for introducing operating fluid under pressure from said inlet means to inflate said membrane to form a plenum chamber extending between said load receiving member and the support surface, said membrane being substantially impermeable by the operating fluid and including a plurality of independently replaceable layers with at least one of said layers being formed of a flexible and dimensionally stable material for limiting expansion of said membrane upon inflation of said membrane with said pressurized fluid.

2. A fluid bearing as set forth in claim 1, wherein said membrane includes an outer layer formed of an elastomeric wear-resistant material contiguous with said layer of flexible and dimensionally stable material.

3. A fluid bearing as set forth in claim 1, wherein said membrane includes an inner layer proximate said second surface of said load receiving member and formed of a stretchable fluid-impermeable material, an outer layer formed of an elastomeric wear-resistant material, and wherein said layer of flexible and dimensionally stable material is an intermediate layer positioned between said inner and outer layers.

4. A fluid bearing as set forth in claim 3, wherein said connecting means includes means for connecting said inner, intermediate, and outer layers to said load receiving member and for enabling said outer layer to be replaced independently of said inner and intermediate layers.

5. A fluid bearing as set forth in claim 3, wherein said intermediate layer of said membrane is effective to limit expansion of said inner layer upon introduction of fluid under pressure to inflate said membrane.

6. A fluid bearing as set forth in claim 3, wherein said second surface of said member includes a radially inner annular surface, and wherein said connecting means includes a first radially inner annular ring, means for gripping said inner and intermediate layers between said inner annular surface and said first inner annular ring, a second radially inner annular ring, and means for gripping said outer layer between said first and second radially inner annular rings.

7. A fluid bearing as set forth in claim 3, wherein said second surface of said load receiving member has a radially outer portion and said connecting means includes a circumferential slot formed in the radially outer portion of said second surface of said load receiving member, an annular retaining ring adapted to be received in said slot for positioning said inner layer and said intermediate layer between said annular ring and slot, and an annular plate for positioning said outer layer between said annular plate and said annular ring.

8. A fluid bearing as set forth in claim 1, 3 or 2, wherein said second surface of said load receiving member includes a radially outer portion and said connecting means includes a circumferential slot formed in the radially outer portion of said second surface of said load receiving member, a retaining ring adapted to be snugly received in said slot when said membrane is positioned between said slot and said retaining ring, and ring clamp means extending about said radially outer portion of said load receiving member for compressing said ring and said membrane in said slot.

9. A fluid bearing as set forth in claim 8, wherein said connecting means includes a plurality of said circumferential slots and a plurality of said retaining rings, one of said layers of said membrane being draped over a corresponding one of said rings and received in a corresponding one of said slots.

10. A fluid bearing as set forth in claim 1, 3 or 2, wherein said membrane contracts to a generally annular planar configuration in the absence of operating fluid under pressure.

11. A fluid bearing as set forth in claim 1, 3 or 2, wherein said second surface of said load receiving member includes a radially outer annular surface and wherein said connecting means includes a radially outer annular ring and means for gripping said radially outer perimeter portion of said membrane between said radially outer annular surface and said radially outer annular ring.

12. A fluid bearing as set forth in claim 1, 3 or 2, wherein said second surface of said load receiving member includes a radially inner annular surface and said connecting means includes a radially inner annular ring and means for gripping said inner perimeter portion of said membrane between said radially inner annular surface and said radially inner annular ring.

13. A fluid bearing as set forth in claim 1, 3, or 2, wherein said second suface of said load receiving member includes a radially inner annular surface and a radially outer annular surface, and said layer of dimensionally stable material comprises a plurality of ribbons arranged to extend generally radially outwardly from said inner annular surface to said outer annular surface.

14. A fluid bearing as set forth in claim 1, 3 or 2, wherein said layer of dimensionally stable material includes a plurality of trapezoidal pieces of fabric.

15. A fluid bearing as set forth in claim 1, 3 or 2, wherein said second surface of said load receiving member includes a radially inner annular surface and a radially outer annular surface and wherein said connecting means includes a radially inner annular ring, means for gripping said inner perimeter portion of said membrane between said radially inner annular surface of said member and said radially inner annular ring, a radially outer annular ring and means for gripping said outer perimeter portion of said membrane between said radially outer annular surface of said member and said radially outer annular ring, and wherein said radially inner and outer annular rings contact the support surface in the absence of operating fluid under pressure to inflate said membrane.

16. A fluid bearing as set forth in claim 1, 3 or 2, wherein said layer of dimensionally stable material includes a plurality of bands disposed in an annular array, the sides of each of said bands overlapping the sides of adjacent bands and each of said bands being folded whereby both ends of each band are located at the radially outer portion of said annular array.

17. A fluid bearing as set forth in claim 16 further including a circular retaining ring disposed within the folds of said bands.

18. A fluid bearing as set forth in claim 17 wherein said retaining ring is selected from a group of circular retaining rings of different diameters.

19. A fluid bearing as set forth in claim 1, 3 or 2, wherein said layer of dimensionally stable material comprises a generally annular array of radially disposed bands of flexible and dimensionally stable fabric disposed between two of said plurality of independently replaceable layer, the outer perimeter portion of said fabric layer being secured to said load receiving member along said radially outer perimeter portion of said membrane, said bands including surface means for receiving any one of a plurality of ring means for limiting the maximum inside diameter of said annular array of bands.

20. A fluid bearing as set forth in claim 1, 3 or 2 further including second fluid outlet means disposed radially inwardly from said inner perimeter portion of said membrane for introducing operating fluid under pressure into said plenum chamber.

21. A fluid bearing as set forth in claim 20 further including valve means for preventing the flow of fluid through said second fluid outlet means until the pressure of the operating fluid within said membrane exceeds a predetermined pressure.

22. A fluid bearing as set forth in claim 21, wherein said valve means includes an elastomeric element positioned within said second fluid outlet means and moveable in response to fluid pressure between a first position in which the elastomeric element blocks the fluid flowing through said second fluid outlet means and a second position in which the elastomeric element does not block the fluid flow through said second fluid outlet means.

23. A fluid bearing as set forth in claim 20 further including first flow restricting means between said fluid inlet means and said first fluid outlet means for restricting the flow of fluid therebetween and second flow restricting means for restricting the flow of fluid through said second fluid outlet means.

24. A fluid bearing as set forth in claim 23, wherein said first and second flow restricting means comprise respectively separately removeable flow restricting orifice members.

25. A fluid bearing as set forth in claim 24 further including valve means for preventing the flow of fluid through said second fluid outlet means until the pressure of the operating fluid within said membrane exceeds a predetermined pressure, said valve means including an elastomeric valve element connected with said removeable plate positioned in said second fluid outlet means and moveable in response to fluid pressure between a first position in which the valve element blocks fluid flowing through the orifice in said plate of said second fluid outlet means and a second position in which the valve element does not block fluid flow through the orifice in said plate of said second fluid outlet means.

26. A fluid bearing as set forth in claim 24, wherein said second surface of said load receiving member includes a radially inner annular surface and said connecting means includes a radially inner annular ring and means for gripping said radially inner perimeter portion of said membrane and said removable orifice member of said second fluid outlet means between said radially inner annular ring and said radially inner annular surface of said load receiving member.

27. A fluid bearing as set forth in claim 24, wherein said second surface of said load receiving member includes a first annular surface and a second annular surface and said connecting means includes gripping means for pressing said layers of said membrane against said first annular surface of said load receiving member and for pressing said flow restricting orifice member of said second fluid outlet means against said second annular surface of said load receiving member.

* * * * *